US008679215B2

(12) United States Patent
Lim et al.

(10) Patent No.: US 8,679,215 B2
(45) Date of Patent: Mar. 25, 2014

(54) AIR FILTER

(75) Inventors: Yeow Choon Lim, Singapore (SG); Wee Chong Ou, Singapore (SG); Eng Wah Teo, Singapore (SG)

(73) Assignee: Newform Techart Pte Ltd., Singapore (SG)

( * ) Notice: Subject to any disclaimer, the term of this patent is extended or adjusted under 35 U.S.C. 154(b) by 155 days.

(21) Appl. No.: 13/387,513

(22) PCT Filed: Apr. 13, 2010

(86) PCT No.: PCT/SG2010/000144
§ 371 (c)(1),
(2), (4) Date: Apr. 2, 2012

(87) PCT Pub. No.: WO2011/014123
PCT Pub. Date: Feb. 3, 2011

(65) Prior Publication Data
US 2012/0180666 A1    Jul. 19, 2012

(30) Foreign Application Priority Data
Jul. 29, 2009 (SG) ................................ 200905084-0

(51) Int. Cl.
*B01D 46/02* (2006.01)
*B01D 53/04* (2006.01)

(52) U.S. Cl.
USPC .............................................. 55/470; 96/147

(58) Field of Classification Search
USPC .............. 96/108, 147, 151; 55/437, 439, 470, 55/471, 467, 473, 515, 529
See application file for complete search history.

(56) References Cited

U.S. PATENT DOCUMENTS

| 3,860,404 | A | * | 1/1975 | Jochimski | 96/147 |
| 4,361,427 | A | * | 11/1982 | Barradas | 96/135 |
| 4,526,592 | A | * | 7/1985 | Armbruster | 96/121 |
| 4,604,110 | A | * | 8/1986 | Frazier | 95/128 |
| 5,288,306 | A | * | 2/1994 | Aibe et al. | 95/141 |
| 5,435,817 | A | * | 7/1995 | Davis et al. | 55/337 |
| 6,136,055 | A | * | 10/2000 | Stanek | 55/357 |
| 6,853,946 | B2 | | 2/2005 | Cohen et al. | |
| 6,986,806 | B2 | * | 1/2006 | Kvietok et al. | 96/132 |
| 7,789,921 | B2 | * | 9/2010 | Thurin et al. | 55/282 |
| 2003/0150326 | A1 | * | 8/2003 | Chasen | 95/273 |
| 2005/0229921 | A1 | | 10/2005 | Krupp | |

FOREIGN PATENT DOCUMENTS

EP    2072920    6/2009

* cited by examiner

*Primary Examiner* — Frank Lawrence, Jr.
(74) *Attorney, Agent, or Firm* — Wells St. John P.S.

(57) ABSTRACT

An air filter having an inlet for air and an outlet for air comprises a body having a central channel, a first side with a first area, a second side having a second area, and a middle having a middle area, positioned between the first side and the second side. The middle area is less than the first area and less than the second area. A first fan is positioned in the body near the first side, and a second fan positioned in the body near the second side, and each fan blows air in the same direction. A filter cartridge is positioned in the central channel at the middle, wherein during operation air flows from the inlet to the filter cartridge to the outlet.

29 Claims, 6 Drawing Sheets

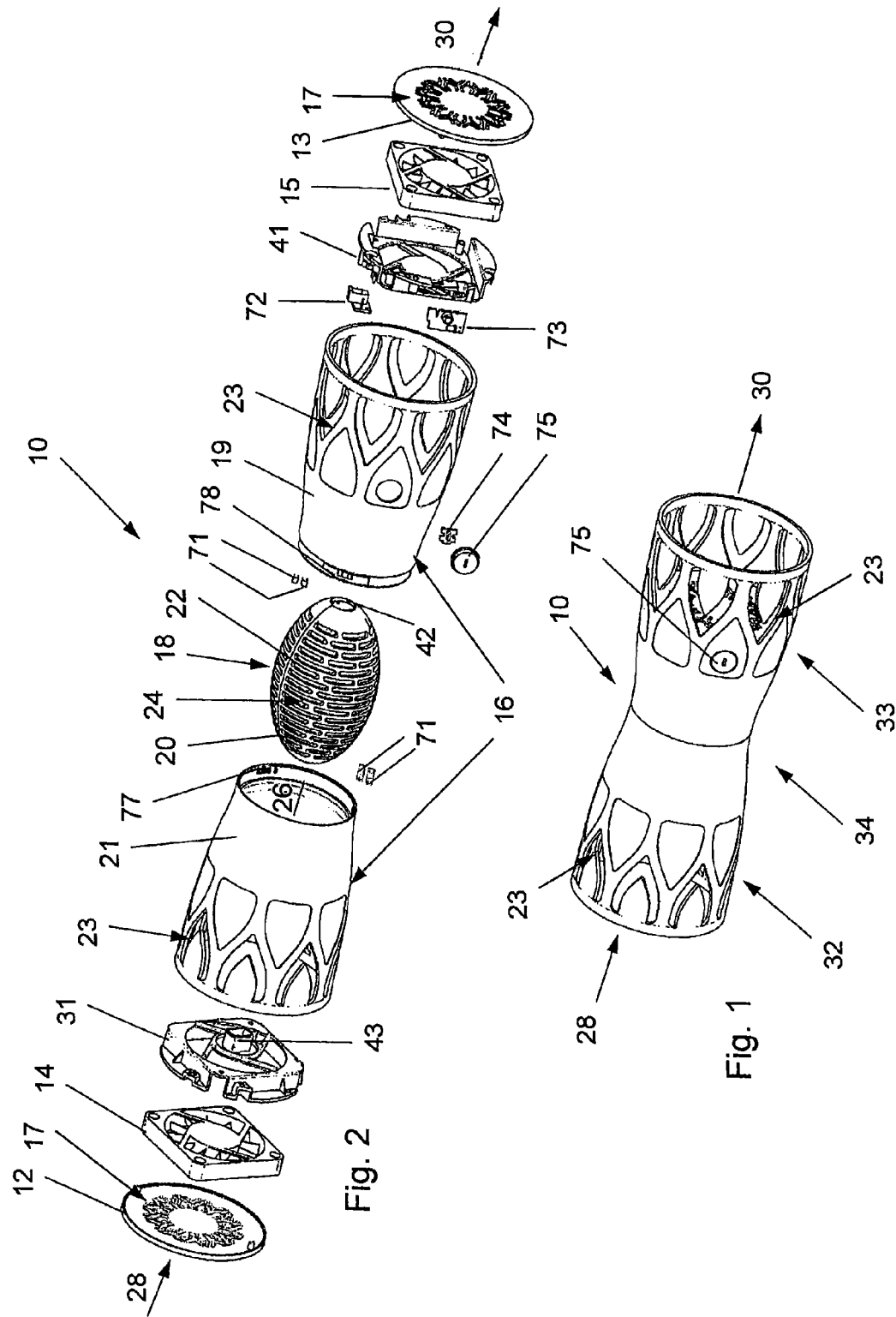

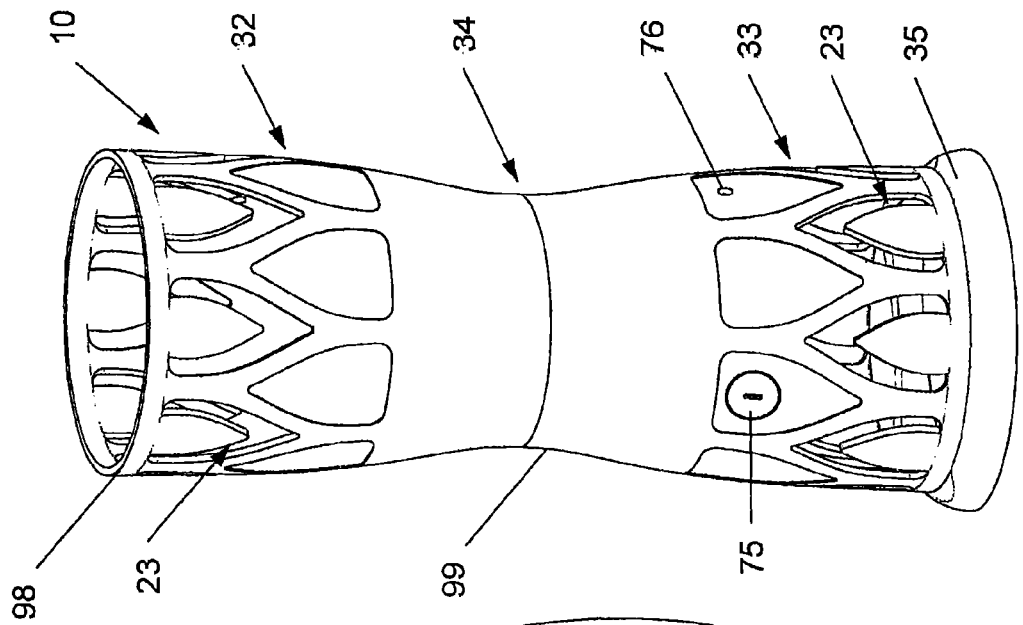
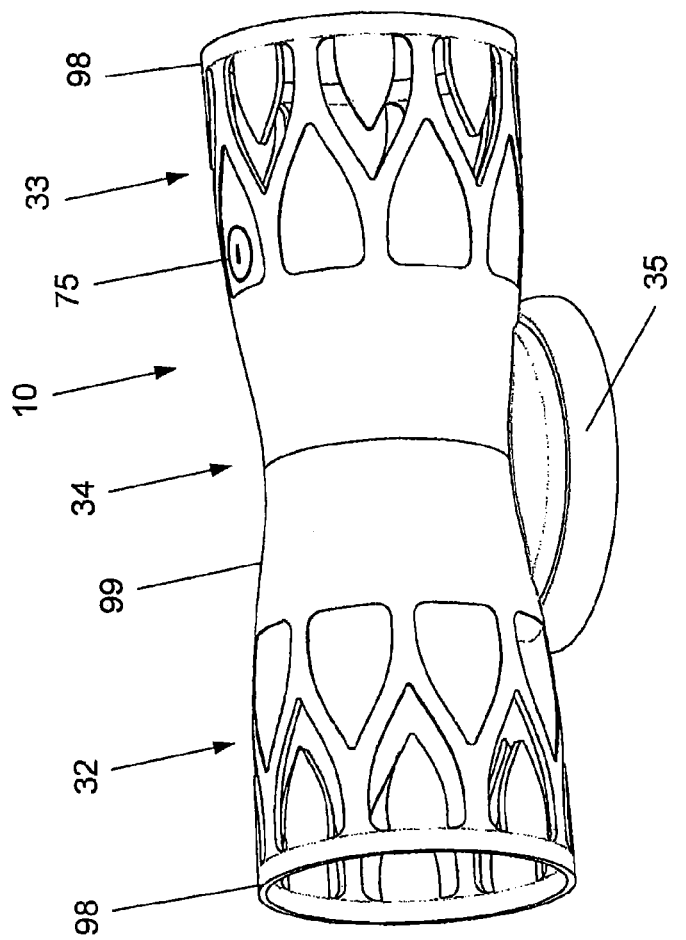
Fig. 6
Fig. 5

AIR FILTER

CROSS REFERENCE TO RELATED APPLICATION

This is a 35 U.S.C. §371 application of, and claims priority to, International Application No. PCT/SG2010/000144, which was filed on Apr. 13, 2010, which claims priority to Singapore Patent Application No. 200905084-0, which was filed on Jul. 29, 2009, the entirety of all applications are incorporated herein by reference.

FIELD OF THE INVENTION

This invention pertains to air filters, and more particularly to compact air filters suitable for use in enclosed spaces such as automobiles and houses.

BACKGROUND OF THE INVENTION

Known air filters are used to removed undesirable elements such as smoke, dust and undesirable odours from the air. In many instances, it is desirable to remove such undesirable elements as rapidly as possible. Also, in some relatively small and enclosed spaces, an air filter cannot be too large or noisy as it may inhibit proper use of the space. It would be desirable to provide an air filter of elegant construction which quickly reduces odours in an enclosed space.

SUMMARY OF THE INVENTION

An air filter having an inlet for air and an outlet for air comprises a body having a central channel, a first side with a first area, a second side having a second area, and a middle having a middle area, positioned between the first side and the second side. The middle area is less than the first area and less than the second area. A first fan is positioned in the body near the first side, and a second fan positioned in the body near the second side, and each fan blows air in the same direction. A filter cartridge is positioned in the central channel at the middle, wherein during operation air flows from the inlet to the filter cartridge to the outlet.

From the foregoing disclosure and the following more detailed description of various embodiments it will be apparent to those skilled in the art that the present invention provides a significant advance in the technology of air filters. Particularly significant in this regard is the potential the invention affords for providing a high quality, low cost air filter. Additional features and advantages of various embodiments will be better understood in view of the detailed description provided below.

BRIEF DESCRIPTION OF THE DRAWINGS

FIG. 1 is an isometric, assembled view of an air filter in accordance with one embodiment.

FIG. 2 is an exploded view of the air filter of FIG. 1

FIG. 5 shows the air filter mounted on a stand in a horizontal position.

FIG. 6 shows the air filter mounted on a stand in a vertical position.

Figure 3:
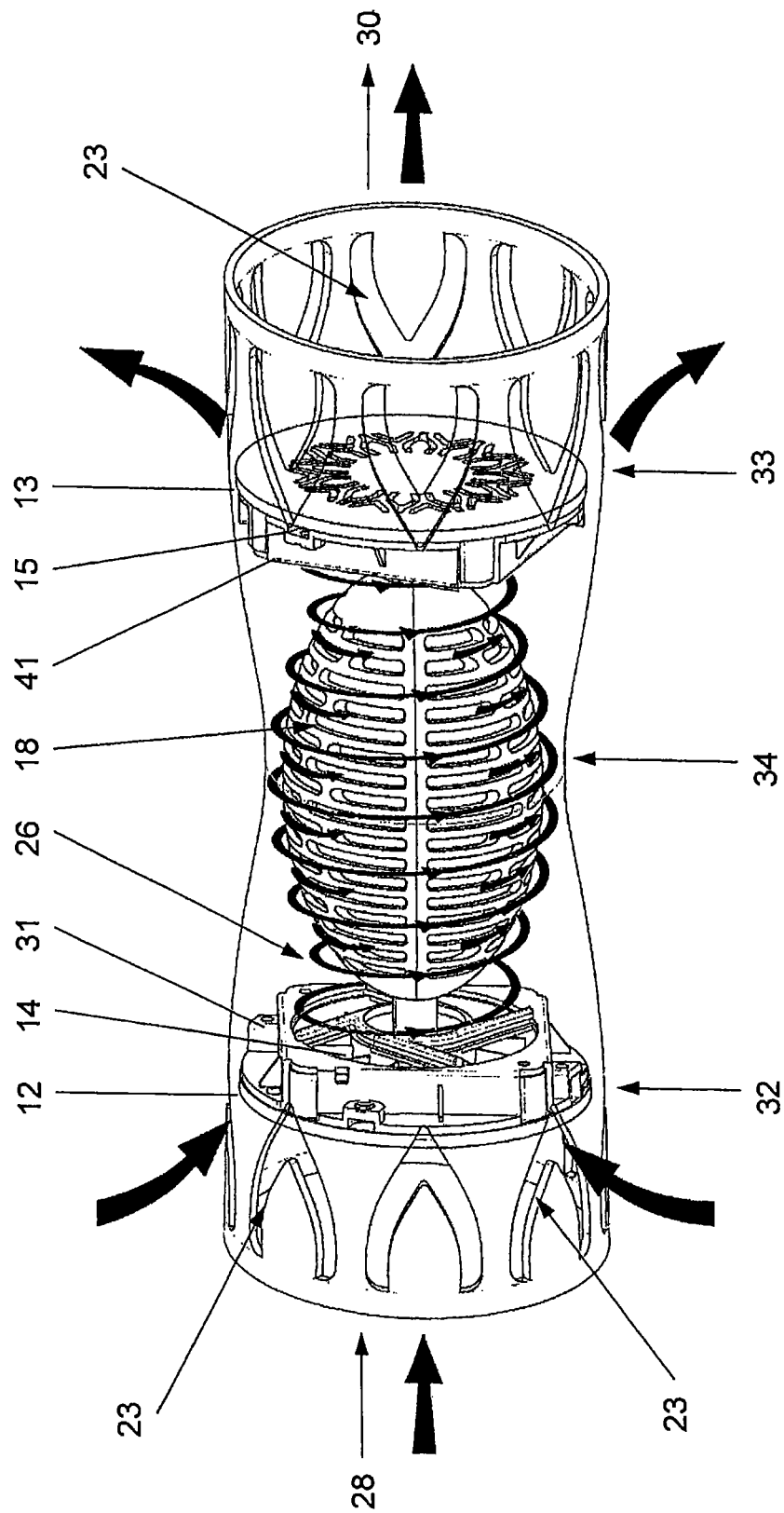
FIG. 3 is an isometric view of the air filter of FIG. 1 showing an air flow pattern.

It should be understood that the appended drawings are not necessarily to scale, presenting a somewhat simplified representation of various features illustrative of the basic principles of the invention. The specific design features of the air filter as disclosed here, including, for example, the specific dimensions of the filter cartridge, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the air filter disclosed here. The following detailed discussion of various alternate features and embodiments will illustrate the general principles of the invention with reference to an air filter suitable for use in automobiles and houses. Other embodiments suitable for other applications will be apparent to those skilled in the art given the benefit of this disclosure.

Turning now to the drawings, FIG. 1 shows an air filter 10 in accordance with one embodiment having an elegant exterior and attractive hour-glass appearance. As shown in FIG. 1, air enters the air filter from the left at air inlet 28 and exits on the right at air outlet 30. In accordance with a highly advantageous feature, the air filter 10 has a first side 32 with a first area, a second side 33 having a second area, and a middle 34 having a middle area, positioned between the first side 32 and the second side 33. Areas are understood here to mean cross sectional areas generally perpendicular to a flow of the air. The middle area is less than the first area and less than the second area. Thus, air flow increases at the constriction at the middle.

FIG. 2 shows an exploded view of the air filter. The air filter 10 comprises an inlet cap 12, a main body 16 comprised of a pair of halves, 21 and 19, an outlet cap 13, and a pair of fans 14, 15. Caps 12 and 13 have openings 17 to allow air to flow into the body 16. Each cap may be attached to the body in any of a number of ways, such as by snap fit connection, or screwed into a socket. The first fan 14 is positioned in the body 16, preferably near the first half 21. The second fan 15 is positioned in the body near the second half 19. Each half 19, 21 can be provided with a series of holes 23 to allow air to enter (inlet holes on 21) or exit (outlet holes on 19) into a central channel 26 of the main body 16. The inlet holes 23 and the outlet holes 23 extend circumferentially around the body 16. Advantageously, each fan blows air in the same direction in the central channel 26 from the inlet and toward the outlet. The body 16 may be formed as two halves 19, 21 operatively connected as shown, or as a one piece or unitary construction.

An on/off button 75 is provided on an exterior of the body. The on/off button is electrically connected to the fans, and turns the fans on and off. Such electrical connection can be accomplished in one of numerous ways readily apparent to those skilled in the art given the benefit of this disclosure. For example, electrical contacts on each half 19, 21 along with appropriate wiring can electrically connect together fans 14, so that they operate together. Also, a dc socket 72 may be soldered onto a dc power circuit board, and a tact switch 73 with LED may be soldered onto an On/Off circuit board.

A filter cartridge 18 is provided near the middle of the air filter. Air flow is from the inlet cap 12, past the filter cartridge 18 and through the outlet cap 13. The filter cartridge acts to filter the air as it flows over and through it. Filter cartridge 18 is advantageously provided with a perforated housing 20 provided with a series of perforations 24 which run around the housing in a direction generally perpendicular to the flow of air. The perforated housing may comprise, for example, a two-piece assembly which can be connected together ultrasonically. Filter material 22 may be accessed through the perforations and can comprise, for example, an air permeable pouch containing an agent for filtering undesirable elements and odours out of the air such as activated carbon, charcoal, etc. As shown in FIGS. 2-3, a plug 43 and socket 42 may be used to connect the brackets 31, 41 with the filter cartridge 18. The plug 43 is formed on the brackets and the sockets 42 are formed on the filter cartridge 18. It will be readily apparent to those skilled in the art, given the benefit of this disclosure, that the plug and socket may be reversed such that the plugs are formed on the filter cartridge and the sockets are formed on the brackets. Optionally, the filter cartridge 18 may be generally egg shaped, as shown in the Figs.

A first bracket 31 and a second bracket 41 may also be provided. Each bracket 31, 41 operatively connects the corresponding fan 14, 15 to the filter cartridge 18. First fan 14 may be attached to first bracket 31 by fasteners, for example, securing the fan to within the central cavity. The fan 14 may be covered by the inlet cap 12. In a similar manner, second fan 15 be attached to the second bracket 41, also securing the fan 15 within the central cavity. Fan 15 may be covered by the outlet cap 14.

Figure 4:
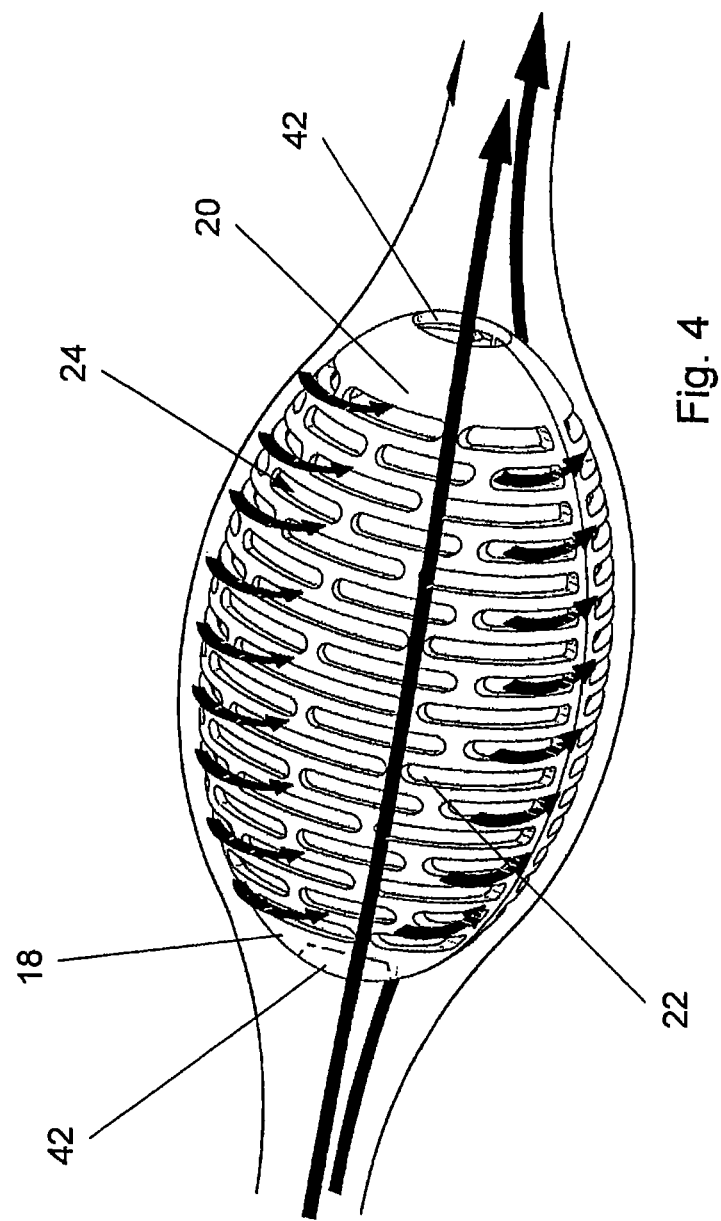
FIG. 4 is an isolated isometric view of a filter cartridge.

FIG. 3 shows air flow through the filter, designated by large arrows. The fan 14 creates a swirling effect, advantageously forcing air to all parts of the air filter, increasing air contact with the filter. FIG. 4 shows how the air travels over and through the filter cartridge 18. Air can travel through the perforations 24 and into the filter material 22, where the dirty air is cleaned. Optionally a small gap is maintained between the thickest portion of the filter cartridge and the body. This allows for consistent air flow and also helps avoid rubbing between the filter cartridge and the body.

FIGS. 5-6 show surfaces 98 and 99 formed on the exterior of the body. Surfaces 98 are a circumferential edge formed at each end of the body, one on the first side 32 and another on the second side 33. Surface 99 can be, as shown in FIGS. 5-6, a curved exterior surface, generally somewhat saddle shaped as shown, positioned near the middle 34 which has an area reduced from the area on either side 32, 33, as previously noted above. Also, an opening 76 may be provided to allow a wire to extend to connect to an external power source.

Figure 7:
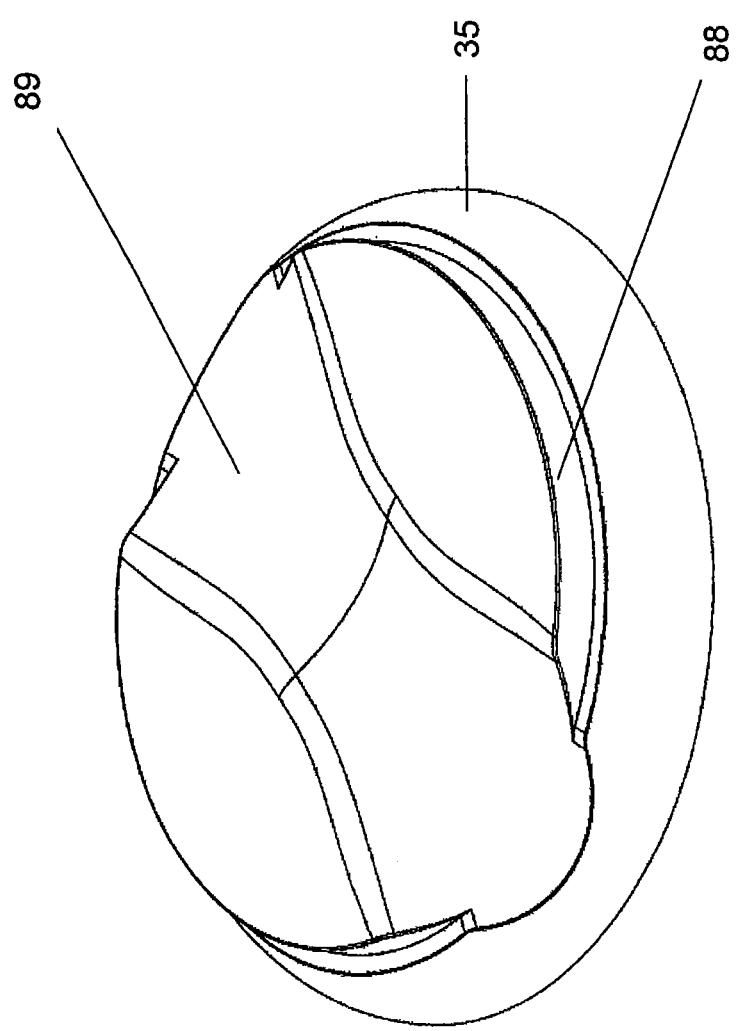
FIG. 7 is an isolated view of the stand.

FIG. 7 shows a stand 35 which can receive the body at one of two positions. The two positions may be at right angles to one another, such as a vertical position and a horizontal position. In the vertical position either surface 98 engages a curved ledge 88 having a circumference slightly less than the circumference of surface 98. This allows the body to stand in one of two vertical positions (inlet at the stand or outlet at the stand) and somewhat resist dislocation from that vertical position when subjected to lateral forces. However, the body may be readily separated from the stand 35 by pulling the body in a vertical direction—i.e., in a direction generally perpendicular to the circumference of surface 98. Side holes 23 allow air flow, since in the vertical position on the stand 35, either one of the inlet 28 or outlet 30 is blocked by the stand. At the horizontal position, shown generally perpendicular to the vertical position, curved exterior surface 99 of the body fits with recessed ledge 89, and the body lays across the stand 35. Ledge 89 somewhat resists dislocation from the horizontal position when subjected to lateral forces. However, the body may be readily separated from the stand 35 by pulling the body in a vertical direction—i.e., in a direction generally perpendicular to the circumference of surface 98.

Figure 9:
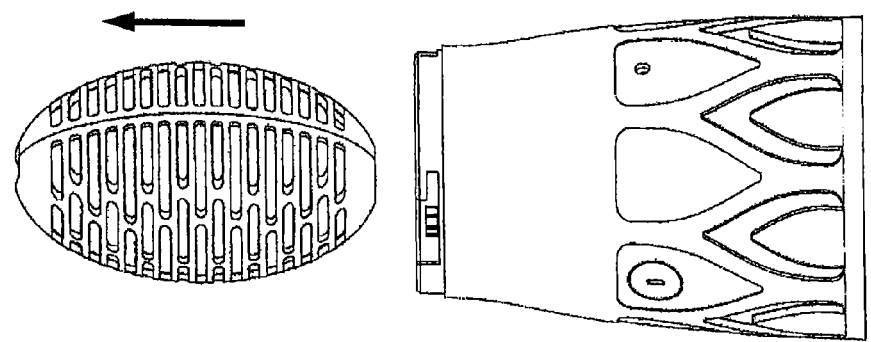
FIGS. 8-9 show one technique for easy separation of the body halves, permitting access to the filter cartridge.
Figure 8:
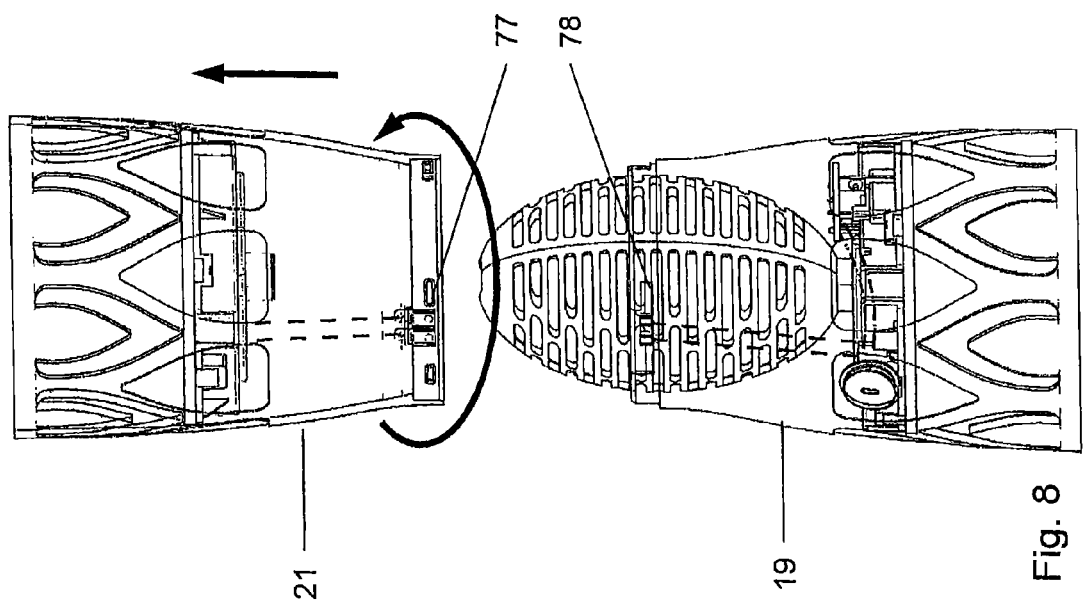

The halves of the body 16 can be formed of a lightweight resin. The halves 19, 21 may be combined into one piece in one of many ways, for example, ultrasonic welding or releasable snap fit connection, for example. FIGS. 2 and 8-9 show one optional technique for connecting the halves together. One of the halves 19, 21 is provided with at least one resiliently deformable flange 77. The other of the halves 21, 19 is provided with a pocket or recess 78 which receives the flange in a snap fit connection. As shown in FIG. 8, to unlock the two halves, first apply pressure on the body to overcome the snap fit connection, then turn to unlock and then separate one body half from the other (as shown by the arrows). This allows access to the filter cartridge for cleaning, service or replacement.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An air filter having an inlet for air and an outlet for air comprising in combination:
    a body having a central channel, a first side, a second side, and a middle positioned between the first side and the second side, wherein a constriction is formed in the central channel at the middle;
    a first fan positioned in the central channel near the first side,
    a second fan positioned in the central channel near the second side, wherein each fan blows air in the same direction: and
    a filter cartridge positioned in the central channel at the middle, wherein during operation air flows from the inlet to the filter cartridge to the outlet, and substantially all air blown from the first fan passes through the second fan.

2. The air filter of claim 1 wherein the filter cartridge comprises a perforated housing containing a filtering agent.

3. The air fitter of claim 2 wherein the filtering agent is one of activated carbon and charcoal.

4. The air filter of claim 2 wherein the perforated housing is provided with a plurality of perforations allowing air access to the filtering agent.

5. The air filter of claim 4 wherein the perforations are aligned in a direction generally perpendicular to a flow of the air.

6. The air filter of claim 1 further comprising an inlet cap at the inlet and an outlet cap at the outlet.

7. The air filter of claim 1 further comprising a first bracket, wherein the first fan is operatively connected to the filter cartridge by the first bracket.

8. The air filter of claim 7 wherein one of the first bracket and the filter cartridge has a plug, and the other of the first bracket and the filler cartridge has a socket, and the plug and socket connect together to secure first bracket to the filter cartridge.

9. The air filter of claim 7 further comprising a second bracket, wherein the second fan is operatively connected to the filter cartridge by the second bracket.

10. The air filter of claim 1 wherein the body comprises two halves, operatively connected near the middle.

11. The air filter of claim 1 further comprising inlet holes end outlet holes formed on the body, allowing air to pass.

12. The air filter of claim 11 wherein the inlet holes and the outlet holes extend circumferentially around the body.

13. The air filter of claim 1 further comprising a stand which supports the body in both a vertical position and a horizontal position perpendicular to the vertical position.

14. The air filter of claim 13 wherein the stand comprises a curved ledge and a recessed ledge, and the body has surfaces formed on the exterior of the body;
wherein the surfaces comprise a pair of circumferential surfaces one on each side of the body, and either circumferential surface engages the curved ledge of the stand and thereby supports the body in the vertical position.

15. The air filter of claim 14 wherein the surfaces comprise a curved exterior surface of the body positioned near the middle which engages the recessed ledge of the stand and thereby supports the body in the horizontal position.

16. The air filler of claim 10 wherein the body halves are releasably connected by snap fit connection.

17. The air filter of claim 1 wherein the filter cartridge comprises only one filter cartridge.

18. The air filter of claim 1 wherein an exterior surface of the body has an hour-glass shape.

19. The air filter of claim 1 wherein the central channel has a circular cross section.

20. The air filter of claim 1 wherein the filler cartridge is shaped with a wider center and ends remote from the center narrower then the center.

21. The air filter of claim 20 wherein the filter cartridge is egg shaped.

22. The air filter of claim 1 wherein the first fan and the second have a same size, and the central channel has a same cross sectional area at both the first fan and the second fan.

23. An air filter having an inlet for air and an outlet for air comprising, in combination:
a body having a central channel having a circular cross section, with a
constriction formed in the central channel at a middle between a first side and a second side;
a first fan positioned in the central channel near the first side;
a second fan positioned in the central channel near the second side, wherein each fan blows air in the same direction; and
a filter cartridge positioned in the central channel at the middle, and shaped with a wider center and ends remote from the center narrower than the center;
wherein the first fan and the second fan have a same size, the central channel has a same cross sectional area at both the first fan and the second fan, and during operation air flows from the inlet to the filter cartridge to the outlet, and substantially all air blown from the first fan passes through the second fan.

24. The air filter of claim 23 wherein the filter cartridge comprises a perforated housing containing a filtering agent comprising one of activated carbon and charcoal; and
the perforated housing is provided with a plurality of perforations allowing air access to the filtering agent.

25. The air filter of claim 23 further comprising a first bracket, wherein both the first fan and the filter cartridge are directly connected to the first bracket.

26. The air filter of claim 25 further comprising a second bracket, wherein both the second fan and the filter cartridge are directly connected to the second bracket.

27. The air filter of claim 23 further comprising a stand which supports the body in both a vertical position and a horizontal position perpendicular to the vertical position.

28. The air filter of claim 23 wherein the filler cartridge comprises only one filter cartridge.

29. The air filter of claim 23 wherein the filter cartridge is egg shaped.

* * * * *

UNITED STATES PATENT AND TRADEMARK OFFICE
CERTIFICATE OF CORRECTION

| | | |
|---|---|---|
| PATENT NO. | : 8,679,215 B2 | Page 1 of 1 |
| APPLICATION NO. | : 13/387513 | |
| DATED | : March 25, 2014 | |
| INVENTOR(S) | : Yeow Choon Lim et al. | |

It is certified that error appears in the above-identified patent and that said Letters Patent is hereby corrected as shown below:

In the Specification

Column 2, lines 64-65 – Replace "fans 14, so" with --fans 14, 15 so--

Column 3, line 43 – Replace "Surfaces 98 are a circumferential edge" with
--Surfaces 98 are circumferential edges--

In the Claims

Column 4, line 53 – Replace "The air fitter of" with --The air filter of--

Column 5, line 1 – Replace "the filler cartridge" with --the filter cartridge--

Column 5, line 10 – Replace "end outlet holes" with --and outlet holes--

Column 5, line 27 – Replace "The air filler of" with --The air filter of--

Column 5, line 35 – Replace "the filler cartridge" with --the filter cartridge--

Signed and Sealed this
Twenty-fourth Day of June, 2014

Michelle K. Lee
*Deputy Director of the United States Patent and Trademark Office*